(12) United States Patent
Kim (10) Patent No.: US 7,564,523 B2
(45) Date of Patent: Jul. 21, 2009

(54) MAKING LCD PANEL ALIGNMENT LAYERS AND SPACERS

(75) Inventor: Sang Il Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 197 days.

(21) Appl. No.: 11/880,915

(22) Filed: Jul. 24, 2007

(65) Prior Publication Data
US 2008/0049180 A1 Feb. 28, 2008

(30) Foreign Application Priority Data
Jul. 25, 2006 (KR) .................... 10-2006-0069685

(51) Int. Cl.
*G02F 1/1337* (2006.01)
(52) U.S. Cl. .................... 349/123; 349/155; 349/156
(58) Field of Classification Search .............. 349/123, 349/155–156
See application file for complete search history.

(56) References Cited

U.S. PATENT DOCUMENTS 6,842,211 B2 * 1/2005 Katsura .................... 349/123

* cited by examiner

*Primary Examiner*—David Nelms
*Assistant Examiner*—Phu Vu
(74) *Attorney, Agent, or Firm*—Haynes and Boone, LLP (57) ABSTRACT

Methods and apparatus are described for forming an alignment layer and integral spacers on an LCD substrate simultaneously using a non-photolithographic imprinting process and for manufacturing LCD panels incorporating such substrates. One method includes forming a first alignment layer and a plurality of integral spacers simultaneously and of the same material on one LCD substrate, forming a second alignment layer on the other substrate, and arranging the two substrates such that the two alignment layers are disposed in facing opposition to each other, with the spacers interposed therebetween.

16 Claims, 10 Drawing Sheets

MAKING LCD PANEL ALIGNMENT LAYERS AND SPACERS

RELATED APPLICATIONS

This application claims priority of Korean patent application 2006-69685, filed Jul. 25, 2006, the entire disclosure of which is incorporated herein by reference.

BACKGROUND

This disclosure relates to liquid crystal displays (LCDs) in general, and in particular, to methods and apparatus for simultaneously forming LCD panel alignment layers and integral column spacers with a non-photolithographic patterning process.

In an effort to address the relatively large size and weight penalties of conventional Cathode Ray Tube (CRT) displays, a variety of flat panel display types, including LCDs, plasma display panels (PDPs), field emission displays (FEDs), and light emitting diode displays (LEDDs) have recently been researched and developed as substitutes therefor, all of which are thinner, lighter and occupy less volume than comparable CRT displays.

The display panel of an LCD produces an image by adjusting the light transmittance of the molecules of a layer of liquid crystal material disposed between two substrates of the panel. The LCD panel is formed by bonding a color filter substrate, having a color filter array disposed thereon, to a thin film transistor (TFT) substrate, having a TFT array comprising a plurality of transistors and signal lines disposed thereon, with the layer of liquid crystal material being sandwiched between the two substrates. Each of the two substrates is respectively coated with an alignment layer, and a "cell gap" created between the two substrates to contain the liquid crystal layer is defined and maintained by a plurality of column spacers disposed therebetween.

In conventional LCD manufacturing techniques, the column spacers are formed by a photolithography process, which includes steps involving photoresist coating, mask alignment, exposure and development, and stripping.

However, the photolithography process has a number of drawbacks, including that it requires a long time to complete, is wasteful of the photoresist stripping solution, and requires large, expensive photolithography equipment, the size and cost of which escalate dramatically as LCD panel sizes increase and pattern sizes decrease.

BRIEF SUMMARY

In accordance with the exemplary embodiments thereof described herein, the present invention provides methods and apparatus for manufacturing LCD panels having an alignment layer and spacers integrally formed thereon by a non-photolithographic patterning process.

In one exemplary embodiment, a method for manufacturing an LCD panel includes simultaneously forming a first alignment layer and integral spacers on a first substrate using an imprinting process, forming a second alignment layer on a second substrate facing the first substrate, and disposing the first and second substrates in facing abutment with each other such that the spacers are interposed between the two substrates.

In one preferred exemplary embodiment, forming the first alignment layer and spacers includes coating a surface of the first substrate with an alignment solution, aligning a flat panel mold comprising a flat panel having a pattern of longitudinal slots in a lower surface thereof over an upper surface of the alignment solution, pressing the mold onto the upper surface of the alignment solution such that the first alignment layer is formed between the lower surface of the mold and the substrate, and an elongated column spacer is formed in a respective one of each of the slots of the mold. The first alignment layer and the spacers are then hardened by applying heat to them, and a surface of the alignment layer is then brushed in a selected direction to form alignment striations therein.

In another preferred embodiment, forming the first alignment layer and spacers includes coating a surface of the first substrate with an alignment solution, aligning a roll type mold comprising a roll having a plurality of axial slots in an outer surface thereof over an upper surface of the alignment solution; rolling the mold over the surface of the alignment solution such that the first alignment layer is formed between the outer surface of the mold and the substrate and an elongated column spacer is formed in each of the axial slots of the mold. The first alignment layer and the spacers are then hardened by applying heat to them, and a surface of the alignment layer is then brushed in a selected direction to form alignment striations therein.

The first substrate may comprise either a glass or a flexible plastic substrate, and in the case of the latter, the first substrate can be wound onto and unwound from a base roller from either end of the substrate.

In accordance with another exemplary embodiment, an LCD panel comprises first and second substrates disposed in facing abutment with each other, a layer of a liquid crystal material sealed between the two substrates, first and second alignment layers formed on respective ones of the substrates, and a plurality of column spacers formed on a surface of an associated one of the two alignment layers for defining and maintaining a uniform cell gap between the two substrates, the spacers being integrally formed with the associated alignment layer simultaneously and of the same material.

At least one of the first and second substrates may comprise a glass or a flexible plastic substrate.

In accordance with another exemplary embodiment, a method for manufacturing an LCD panel comprising a pair of substrates disposed in facing abutment with each other includes forming a first alignment layer and a plurality of spacers of the same material on one of the substrates, and forming a second alignment layer facing the first alignment layer on the other substrate.

The first alignment layer and spacers are preferably formed simultaneously by coating an alignment solution on the substrate and then patterning the alignment solution with a mold. In one preferred embodiment, the mold comprises a flat panel having a pattern of elongated bores in a lower surface thereof, and in another preferred embodiment, the mold comprises a roll having at least one axial bore in an outer surface thereof which is rolled over the alignment and spacer solution coated on the one substrate.

A better understanding of the above and many other features and advantages of the methods and apparatus of the present invention, as well as LCD panels manufactured using such methods and apparatus, may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

Figure 1:
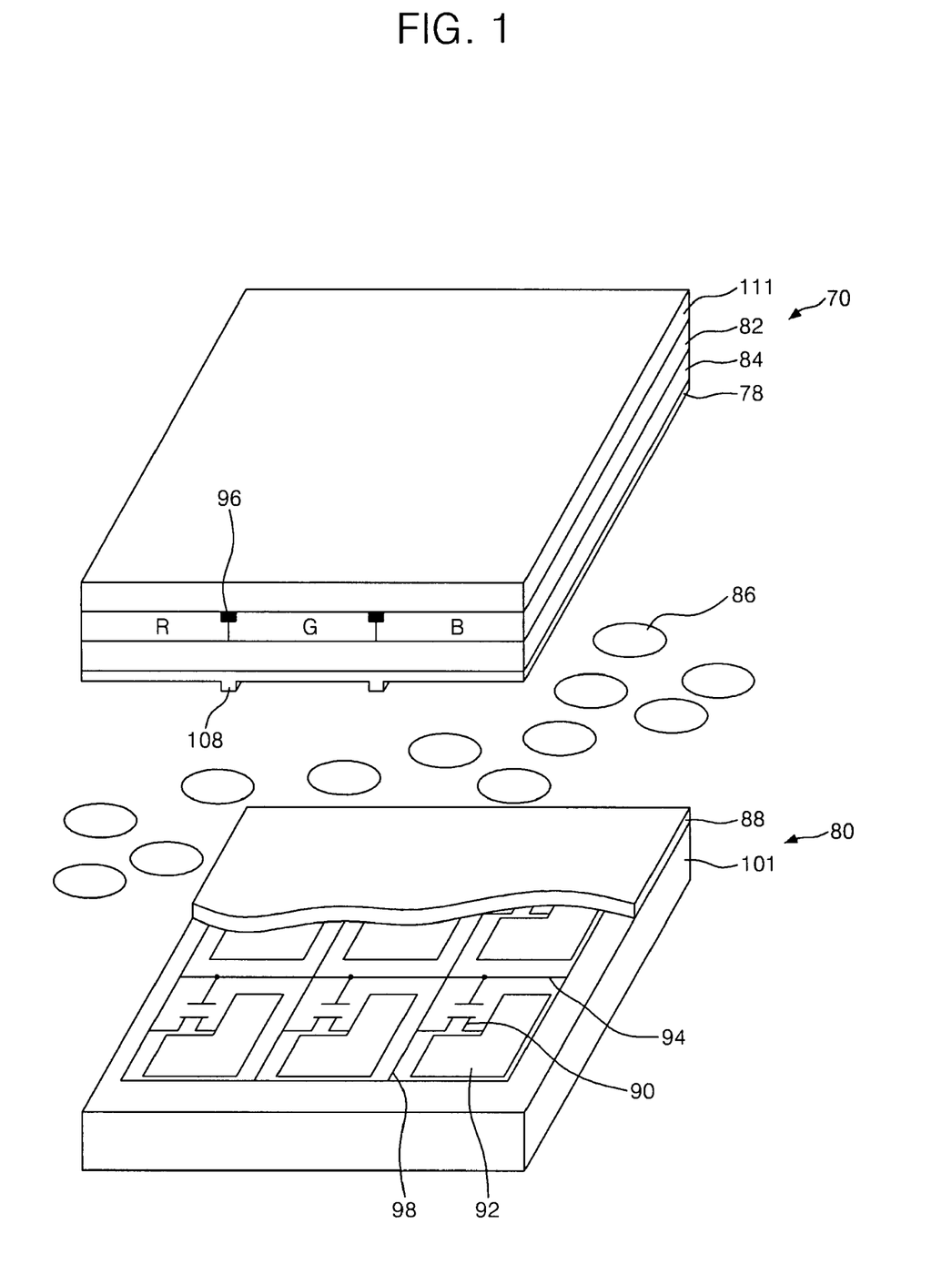
FIG. 1 is schematic exploded upper front and side perspective view of an exemplary embodiment of an LCD panel manufactured in accordance with the methods and apparatus of the present invention.

FIG. 1 is schematic exploded upper front and side perspective view of an exemplary embodiment of an LCD panel manufactured in accordance with the methods and apparatus of the present invention. As illustrated in FIG. 1, the LCD panel includes a color filter substrate 70 and a thin film transistor (TFT) substrate 80 in disposed in facing abutment with each other, with a layer of a liquid crystal 86 material sealed between the two substrates 70, 80.

The color filter substrate 70 includes, in descending order, an upper substrate 111 having a black matrix 96, a plurality of color filters 82, a common electrode 84, and an upper alignment layer 78 having a plurality of column spacers 108 integrally formed thereon. The black matrix 96 is formed on a lower surface of the upper substrate 111 and serves to divide the upper substrate 111 into a plurality of cell regions in which the color filters 82 are respectively formed, and also serves to protect against optical interference between adjacent cells and exterior light reflection. The color filters 82 that are formed in respective ones of the cell regions defined by the black matrix 96 include red filters (R), green filters (G), and blue filters (B). The color filters 82 function to transmit light of a corresponding color, i.e., red, green one blue light, though respective ones of the filter regions.

The common electrode 84 is a transparent conductive layer coated on the surface of the color filters 82 and provides a common voltage ($V_{com}$) as a reference voltage for driving the LCD panel. The upper alignment layer 78 is coated on the upper substrate 111 on which the black matrix 96, color filter 82, and the common electrode 84 have previously been formed and functions in cooperation with a lower alignment layer 88 on the TFT substrate 80 to align the molecules of the liquid crystal 86 in a desired orientation.

The column spacers 108 function to define a cell gap between the TFT substrate 80 and the color filter substrate 70 and to maintain it uniformly constant across the width and breadth of the LCD panel after the two substrates 70, 80 are assembled together. The column spacers 108 and the upper alignment layer 78 are formed integrally, of the same material, and simultaneously, in the manner described in more detail below.

As illustrated in FIG. 1, the TFT substrate 80 includes a lower substrate 101 having a grid comprising a plurality of mutually orthogonal gate lines 94 and data lines 98 defining a matrix containing plurality of cell regions, each having an associated thin film transistor (TFT) 90 and pixel electrode 92 formed therein, and a lower alignment layer 88 formed over the matrix of cell regions. The thin film transistors 90 supply the associated pixel electrodes 92 with a data signal received from an associated data line 98. In order to supply the data signal, each thin film transistor 90 is formed in a semiconductor pattern that includes a gate electrode connected to the associated gate line 94, a source electrode connected to an associated data line 98, an active layer, and an ohmic layer that establishes a channel between the source and drain electrodes of the TFT 90 and overlaps the gate electrode, and a gate dielectric layer interposed between the gate electrode and the active and ohmic layers.

The pixel electrode 92, which comprises a transparent conductive layer, applies the data signal from the thin film transistor 90 to the liquid crystal 86 layer disposed immediately above to drive the liquid crystal 86 material in the following manner. The pixel electrode 92 is charged with the data signal supplied from the thin film transistor 90 and thereby generates an electric potential difference between itself and the common electrode 84 on the color filter substrate 70. The molecules of the liquid crystal 86 layer disposed between the TFT substrate 80 and the color filter substrate 70 and immediately above the pixel electrode 92 are rotated by dielectric anisotropy in accordance with the electric potential difference between the two electrodes 84, 92, thereby adjusting the amount of light emanating from a backlight unit that passes through the pixel electrode 92 and is incident on the color filter substrate 70 disposed immediately above the pixel electrode 92.

The lower alignment layer 88 is coated on the lower substrate 101 on which the thin film transistor 90 and the pixel electrode 92 are formed, and functions to align the molecules of the liquid crystal layer 86 in a selected orientation.

In the particular exemplary embodiment of the LCD panel illustrated in FIG. 1, the column spacers 108 and the upper alignment layer 78 are formed integrally to each other, of the same kind of material, and simultaneously, in the manner described in detail below. Accordingly, the process of manufacturing the LCD panel is considerably simplified and its costs of manufacture are substantially reduced.

Figure 2A:
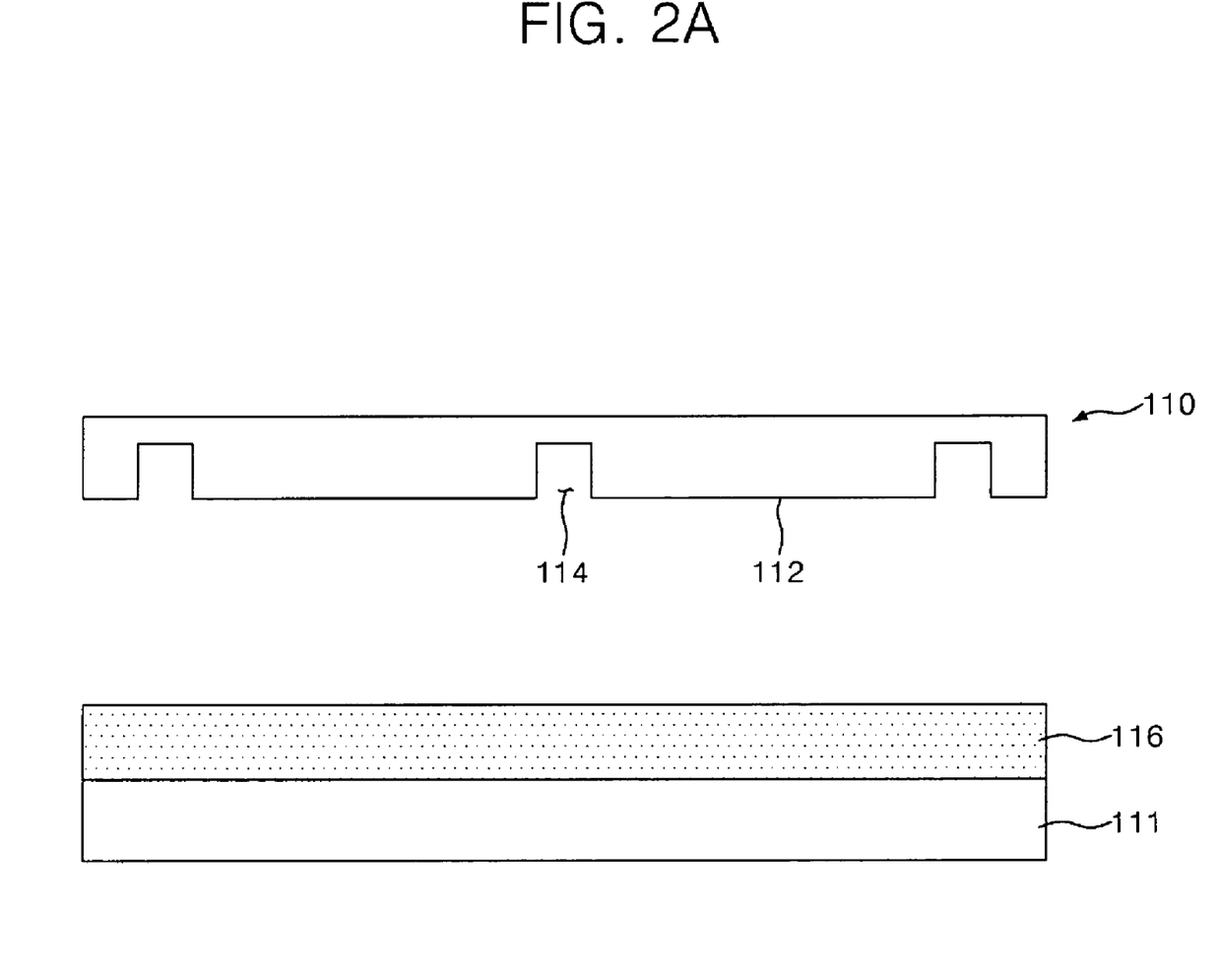
FIGS. 2A to 2C are cross sectional views illustrating sequential steps of an exemplary embodiment of a method for forming an alignment layer and integral column spacers of the exemplary LCD panel of FIG. 1 in accordance with the present invention.
Figure 2B:
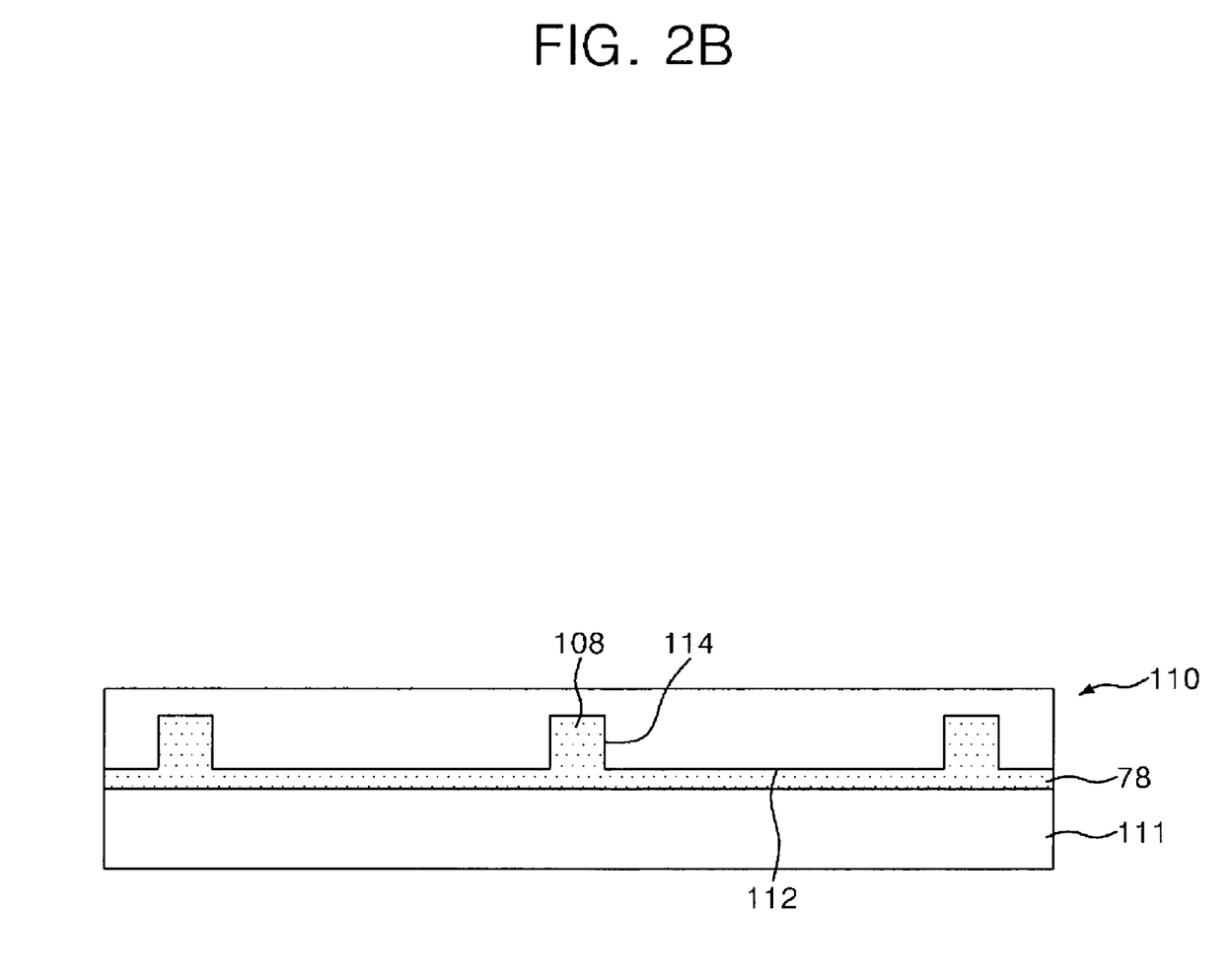
Figure 2C:
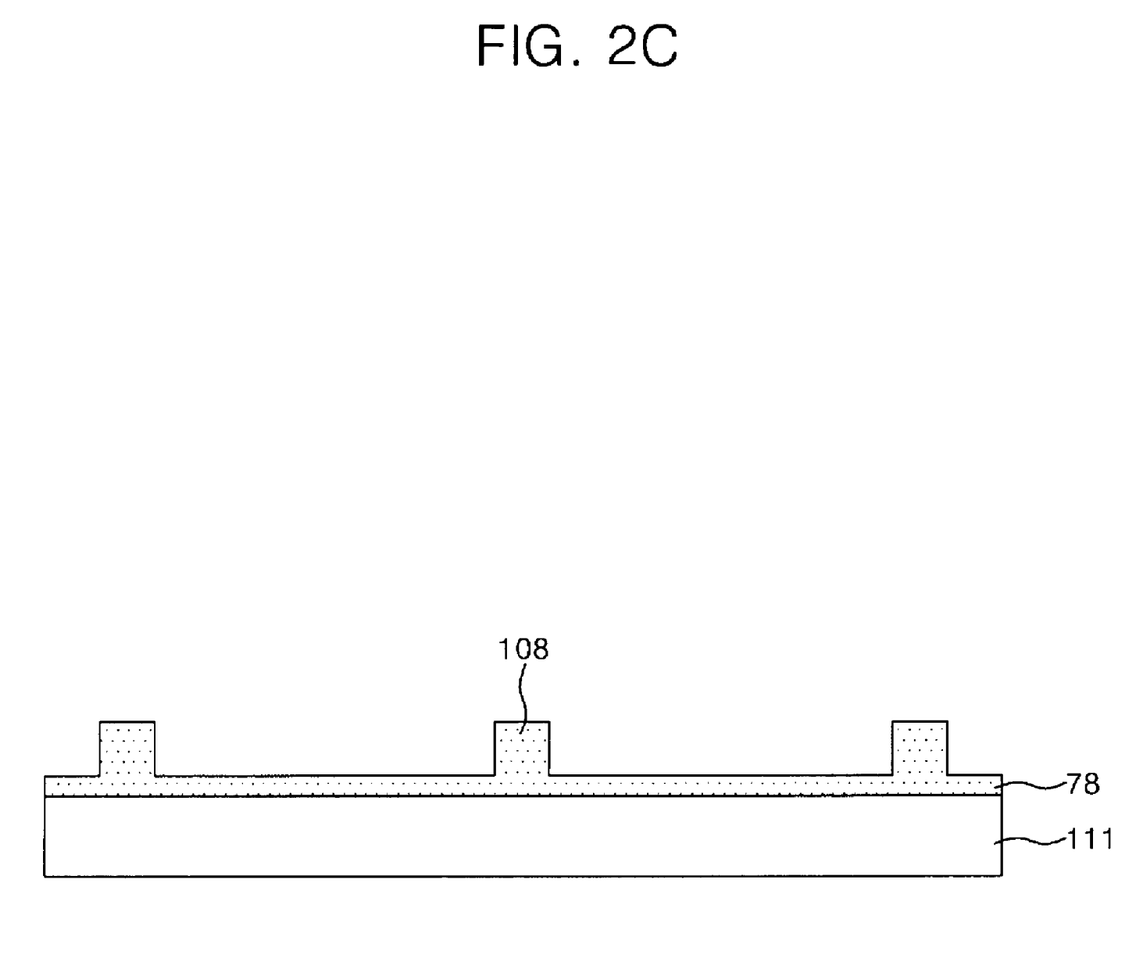

FIGS. 2A to 2C are cross sectional views illustrating sequential steps of an exemplary embodiment of a method for forming an alignment layer and column spacers of the exemplary LCD panel of FIG. 1 in accordance with the present invention. In this embodiment of the method, the process steps are described in connection with the upper alignment layer 78 formed on the upper substrate 111, but it should be understood that the same method can be used to form the lower alignment layer 88 with integral spacers on the lower substrate 101.

As illustrated in FIG. 2A, a liquid alignment solution 116 is coated over the surface of the upper substrate 111 on which a black matrix, color filters, and a common electrode have previously been formed. The alignment solution 116 may be applied to the upper substrate 111 by means of a sprayer equipped with nozzles, or alternatively, by spin coating. The alignment solution 116 can comprise, for example, a polyamide liquid, and the upper substrate 111 can comprise a transparent glass or flexible plastic substrate.

After the upper substrate 111 has been coated with the alignment solution 116, a flat panel type of imprinting mold 110 having a lower surface with a plurality of longitudinal grooves or slots 114 alternating with a plurality of lands 112 is arranged over the upper surface of the alignment solution 116. In one particular exemplary preferred embodiment, the flat panel mold 110 is made of an elastic rubber material, for example, a polydimethylsiloxane (PDMS) material. The lands 112 of the mold 110 face regions in which the alignment layer 78 is to be formed on the substrate 111, and the slots 114 of the mold 110 face regions in which the respective spacers 108 are to be formed on the alignment layer 78.

As illustrated in FIG. 2B, the flat panel type mold 110 is pressed onto the upper surface of the alignment solution 116 with a predetermined amount of pressure such that the lands 112 of the mold 110 press into the alignment solution 116 and force or displace the alignment solution 116 up into the longitudinal slots 114 of the mold 110. As a result, the upper alignment layer 78 is formed between the lands 112 and the upper surface of the upper substrate 111, and accordingly, corresponds to the lands 112 of the mold 110, and the spacers 108 are formed integrally with the alignment layer 78 in respective ones of the slots 114, and accordingly, correspond to respective ones of the slots 114 of the mold 110.

After a selected amount of time has elapsed, the flat panel type mold 110 is separated from the upper substrate 111, as illustrated in FIG. 2C, and the upper alignment layer 78 and the column spacers 108 are then heated, e.g., in an oven, to cure, or harden them. After the heating process, the upper surface of the alignment layer 78, i.e., the surfaces between the upstanding spacers 108, is selectively rubbed, or brushed, with a cloth, i.e., the cloth in which cotton or nylon textile is implanted, to create small furrows, or striations, in the surface that extend in a specific direction thereon, which serve to align the molecules of the liquid crystal material in contact therewith in a selected direction. In an advantageous alternative embodiment, the flat panel type imprinting mold 110 may incorporate a pattern on the surfaces of the lands 112 that corresponds to a "negative" of the striations to be formed on the alignment layer, such that the striations are simultaneously molded into the surface of the alignment layer 78 when the layer and spacers are initially molded on the substrate, thereby eliminating the need for the alignment layer rubbing step.

Figure 3A:
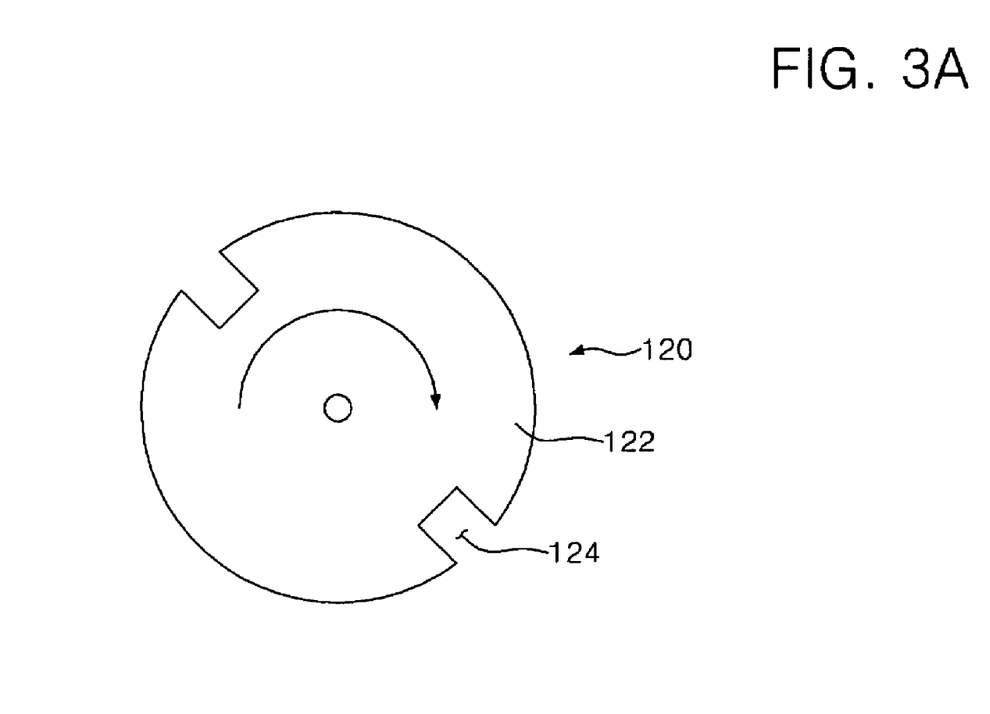
FIGS. 3A to 3C are cross sectional views illustrating sequential steps of another exemplary method for forming an alignment layer and integral column spacers of an LCD panel in accordance with the present invention; and, FIGS. 4A to 4C are cross sectional views illustrating sequential steps of another exemplary method for forming an alignment layer and integral column spacers of an LCD panel in accordance with the present invention.
Figure 3B:
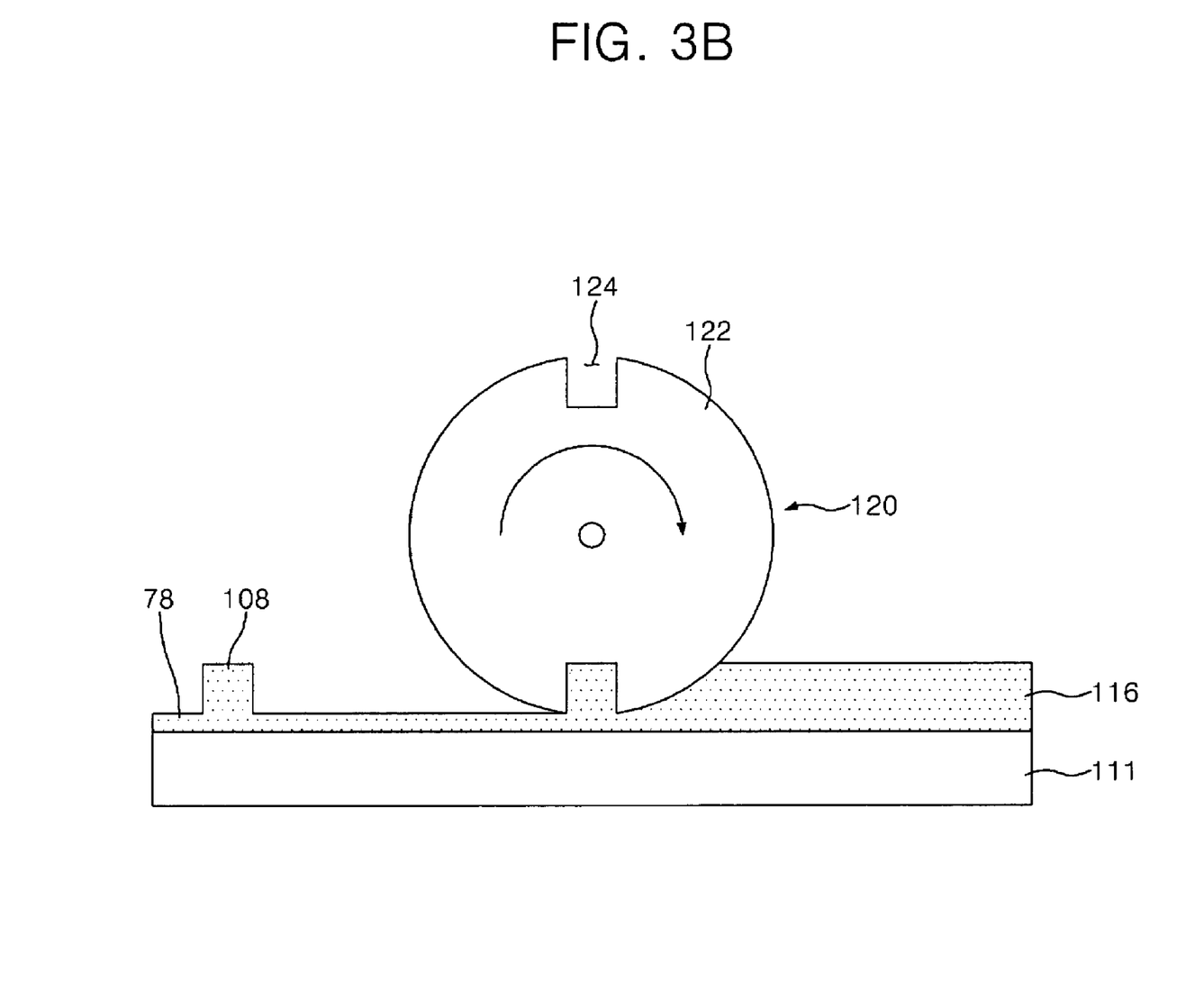
Figure 3C:
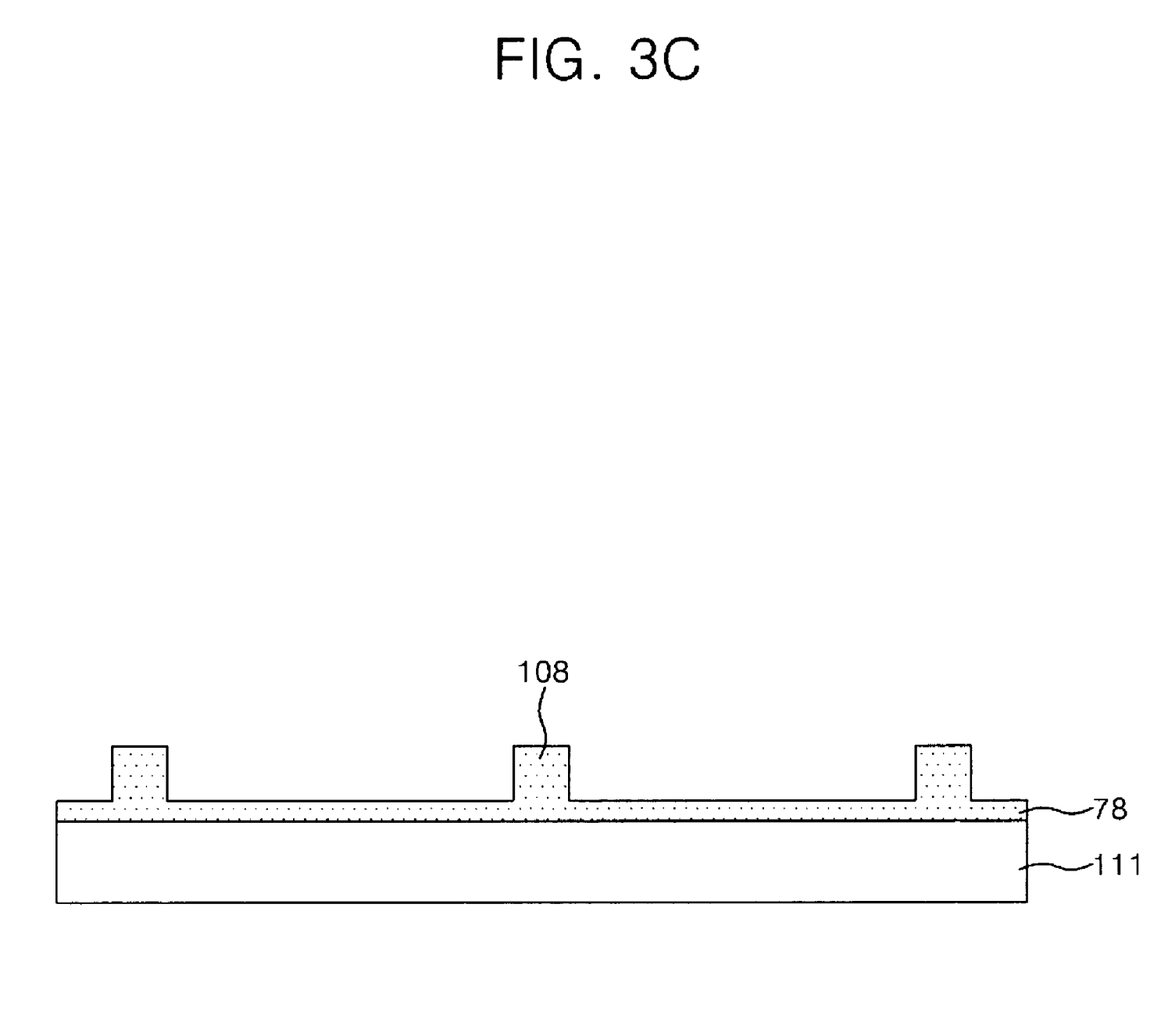

FIGS. 3A to 3C are cross sectional views illustrating sequential steps of another exemplary method for forming an alignment layer and column spacers on an LCD panel in accordance with the present invention. As above, in this embodiment, the steps of the method are described in connection with the upper alignment layer 78 formed on the upper substrate 111.

As illustrated in FIG. 3A, an alignment solution 116 is coated over the surface of the upper substrate 111, on which the black matrix, color filters, and common electrode have previously been formed, by means of a sprayer or by spin coating. As in the previous embodiment, the alignment solution 116 can comprise, e.g., a polyamide liquid, and the substrate 111 can comprise a transparent glass or flexible plastic substrate.

Next, a roll type imprinting mold 120 having an outer, or circumferential surface containing one or more axial slots 124 alternating with one or more axial lands 122 is arranged over an upper surface of the alignment solution 116, as illustrated in FIG. 3A.

As illustrated in FIG. 3B, the roll type mold 120 is then rolled over the alignment solution 116 in a selected direction while the substrate 111 is held stationary, such that the lands 122 of the mold 120 press into the alignment solution 116 and force the alignment solution 116 up into the slots 124 of the mold 120. As a result, the upper alignment layer 78 is formed between the outer surface of the lands 122 of the mold 120 and the upper surface of the substrate 111, and accordingly, corresponds to the lands 122 of the mold 120, and the spacers 108 are formed integrally with the alignment layer 78 in respective ones of the axial slots 124 of the mold 120, and accordingly, correspond to respective ones of the slots 124 of the mold 120.

After a selected period of time has elapsed, the imprinting mold 120 is separated from the upper substrate 111, as illustrated in FIG. 3C, and the upper alignment layer 78 and the column spacers 108 are then heated, e.g., in an oven, to harden them. As in the above embodiment, after the alignment layer 78 and spacers 108 are hardened, the upper surface of the alignment layer 78, i.e., that disposed between the upstanding spacers 108, is selectively rubbed to create alignment striations extending in a specific direction thereon, or alternatively, if the outer surface of the roll type imprinting mold 120 incorporates a negative pattern of the desired striations on the lower surfaces of the lands 122, such that the striations are molded into the upper surface of the alignment layer when the alignment layer and spacers are initially molded on the substrate 111, the rubbing step can be omitted.

Figure 4A:
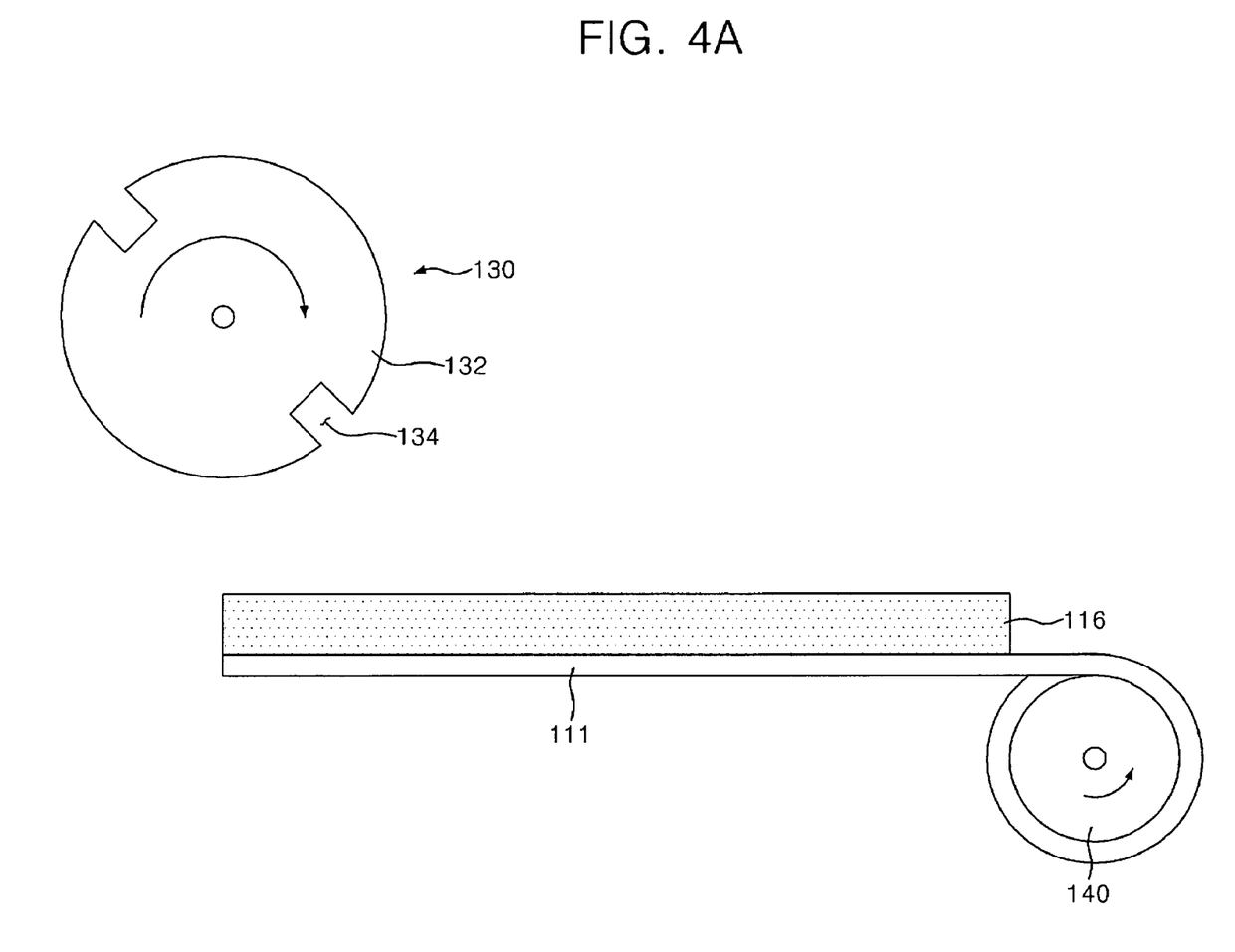
Figure 4B:
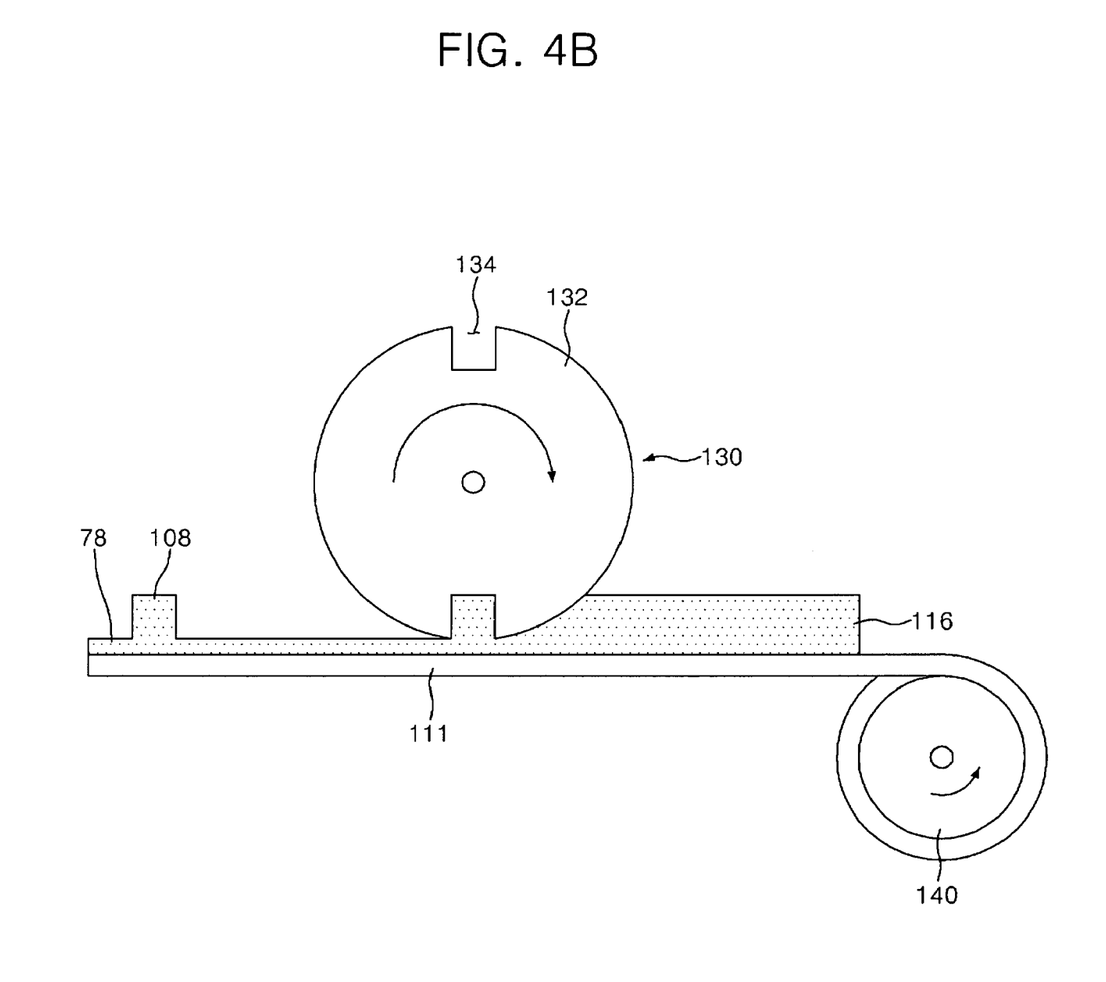
Figure 4C:
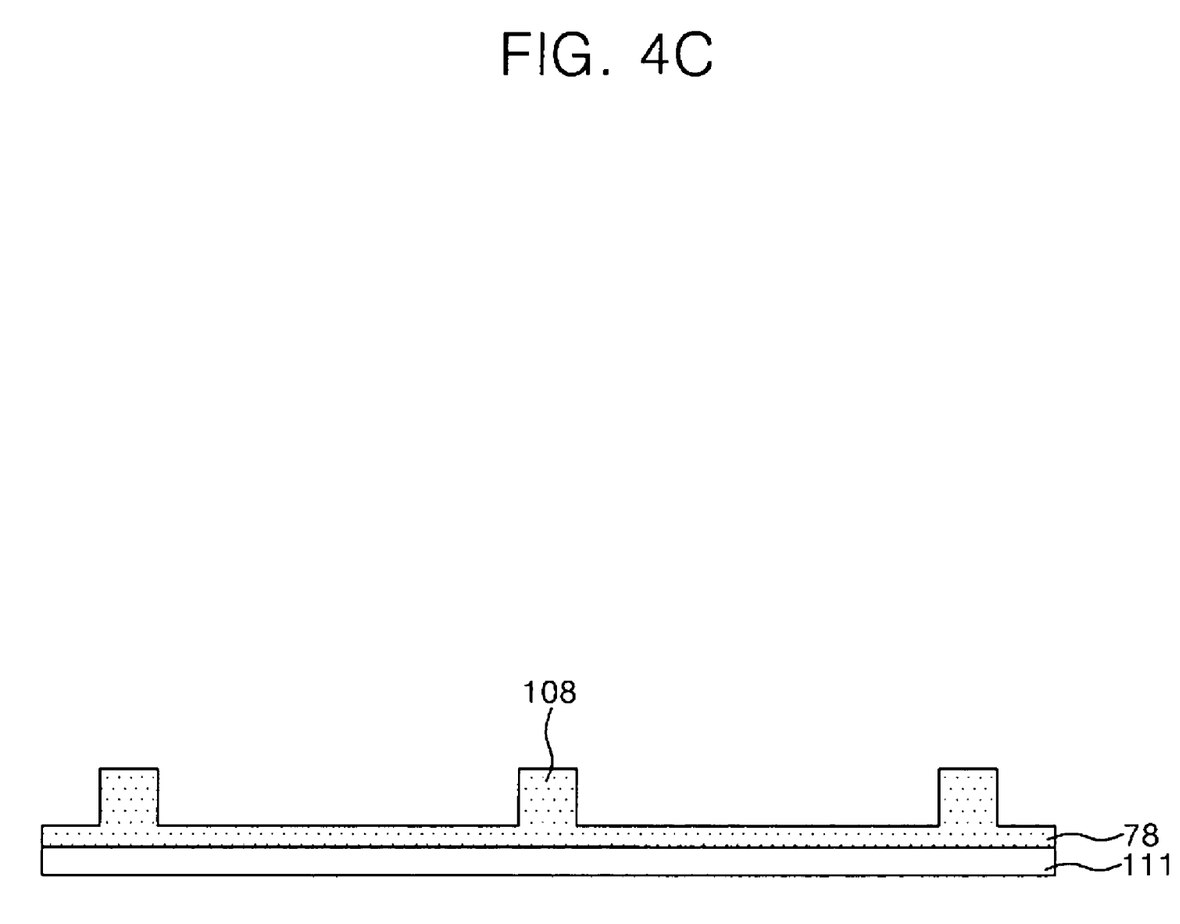

FIGS. 4A to 4C are cross sectional views illustrating sequential steps of another exemplary embodiment of a method for forming an alignment layer and column spacers of an LCD panel in accordance with the present invention. As in the above embodiments, the manufacturing steps are described in connection with the upper alignment layer 78 formed on the upper substrate 111, but can also be used to form the lower alignment layer 88 with integral spacers 108 on the lower substrate 101 of the panel, if desired.

In this particular embodiment, an upper substrate 111 made of a flexible plastic, and on which the black matrix, color filters, and the common electrode have previously been sequentially formed, is wound onto a base roller 140. As illustrated in FIG. 4A, an alignment solution 116 is coated over the upper surface of the upper substrate 111 by a sprayer or a spin coating process, and as above, may comprise, for example, a polyamide liquid.

Next, a roll type imprinting mold 130 having an outer surface containing one or more axial grooves or slots 134 alternating with one or more axial lands 132 is arranged over a surface of the alignment solution 116.

As illustrated in FIG. 4B, the base roller 140 is then rotated in the direction of the arrow shown, causing the flexible plastic substrate 111 to unwind from the base roller 140 and to translate below the rotating roll type mold 130. The mold 130 is rotated at such a speed that the tangential velocity of its outer surface just matches the translational speed of the substrate 111 and coating of alignment solution 116 passing below it, causing the mold 130 to roll over the alignment solution 116 and the lands 132 of the mold to press into the alignment solution 116 and force the alignment solution 116 up into the axial slots 134 of the mold 130. As a result, the upper alignment layer 78 is formed between the lands 132 of the mold 130 and the upper surface of the substrate 111, and accordingly, corresponds to the lands 132 of the mold 130, and the spacers 108 are formed integrally with the alignment layer 78 in respective ones of the slots 134 of the mold 130, and accordingly, correspond to respective ones of the slots 132 of the mold 130, as illustrated in FIG. 4C.

As in the above embodiments, the upper alignment layer 78 and the column spacers 108 are then heated, e.g., in an oven, so as to harden them, and as above, the upper surface of the alignment layer 78 disposed between the upstanding spacers 108 is selectively rubbed to create alignment striations extending in a specific direction thereon. Alternatively, as above, if the outer surface of the roll type imprinting mold 130 is appropriately configured with a negative pattern of the desired striations on the lower surfaces of the lands 132 such that the striations are molded into the surface of the alignment layer 78 when the latter is initially molded on the substrate 111, the rubbing process can be omitted.

As will be appreciated by those of skill in the art, in either of the roll type mold embodiments described above, and depending on the respective sizes of the roll molds and the substrate relative to each other, the molds may contain either a single axial slot and land, which form the alignment layer and spacers in multiple revolutions of the mold effected during a single pass of the mold over the alignment solution, or alternatively, may contain a plurality of alternating axial slots and lands, which form the alignment layer and spacers in a single revolution of the mold effected during a single pass of the mold over the alignment solution.

It should also be understood that, in the embodiments described above, although only the processes for simultaneously forming an upper alignment layer and integral spacers are described, if desired, a lower alignment layer with integral spacers can also be formed simultaneously using the identical methods.

In the exemplary embodiments described herein, the methods and apparatus for manufacturing LCD panels having an alignment layer and integral spacers formed simultaneously thereon by a non-photolithographic imprinting process enable a substantial reduction in the overall LCD panel manufacturing costs to be achieved as a result of the elimination of the prior art photolithography processes and the large, expensive equipments associated therewith. Also, since the imprinting methods and apparatus of the present invention can produce alignment layers and integral column spacers on plastic substrates using a simple imprinting mold, they make possible the manufacture of flexible display panels.

By now, those of skill in this art will appreciate that many modifications, substitutions and variations can be made in and to the methods and apparatus for simultaneously forming LCD panel alignment films and integral spacers of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A method for manufacturing a liquid crystal display panel, the method comprising:
    simultaneously forming a first alignment layer with integral spacers on a first substrate of the panel using an imprinting process;
    forming a second alignment layer on a second substrate of the panel;
    disposing the second substrate in facing abutment with the first substrate; and,
    bonding the first and second substrates together such that the spacers are interposed between the two substrates.

2. The method of claim 1, wherein simultaneously forming a first alignment layer with integral spacers comprises:
    coating a surface of the first substrate with an alignment solution;
    aligning a flat panel mold having a lower surface with a plurality of elongated slots therein over an upper surface of the alignment solution;
    pressing the lower surface of the flat panel mold onto the upper surface of the alignment solution such that the first alignment layer is formed between the lower surface of the mold and the upper surface of the first substrate and the spacers are formed integrally with the first alignment layer in respective ones of the elongated slots of the mold;
    hardening the first alignment layer and the spacers with heat; and,
    rubbing an upper surface of the first alignment layer to form striations therein.

3. The method of claim 1, wherein simultaneously forming a first alignment layer with integral spacers comprises:
    coating a surface of the first substrate with an alignment solution;
    aligning a roll type mold having an outer surface with a plurality of axial slots therein over an upper surface of the alignment solution;
    rolling the outer surface of the roll type mold over the upper surface of the alignment solution such that the first alignment layer is formed between the outer surface of the mold and the upper surface of the first substrate and the spacers are formed integrally with the first alignment layer in respective ones of the axial slots of the mold;
    hardening the first alignment layer and the spacers with heat; and,
    rubbing an upper surface of the first alignment layer to form striations therein.

4. The method of claim 1, wherein the first substrate comprises a glass substrate.

5. The method of claim 1, wherein the first substrate comprises a flexible plastic substrate wound onto a base roller.

6. The method of claim 1, wherein simultaneously forming a first alignment layer with integral spacers comprises:
    coating a surface of the first substrate with an alignment solution;
    aligning a flat panel mold having a lower surface over an upper surface of the alignment solution, with a plurality of elongated slots alternating a plurality of lands on which a pattern corresponding to striations is incorporated;
    pressing the lower surface of the flat panel mold onto the upper surface of the alignment solution such that the first alignment layer having the striations is formed between the lower surface of the mold and the upper surface of the first substrate and the spacers are formed integrally with the first alignment layer in respective ones of the elongated slots of the mold; and,
    hardening the first alignment layer and the spacers with heat.

7. The method of claim 1, wherein simultaneously forming a first alignment layer with integral spacers comprises:
    coating a surface of the first substrate with an alignment solution;
    aligning a roll type mold having an outer surface over an upper surface of the alignment solution, with a plurality of axial slots alternating a plurality of lands on which a pattern corresponding to striations is incorporated;
    rolling the outer surface of the roll type mold over the upper surface of the alignment solution such that the first alignment layer having the striations is formed between the outer surface of the mold and the upper surface of the first substrate and the spacers are formed integrally with the first alignment layer in respective ones of the axial slots of the mold; and,
    hardening the first alignment layer and the spacers with heat.

8. A liquid crystal display panel comprising:
    first and second substrates disposed in facing opposition to each other;

a layer of a liquid crystal material disposed between the first and second substrates;

first and second alignment layers formed on respective ones of opposing surfaces of the first and second substrates; and, a plurality of spacers formed on a surface of an associated one of the first and second alignment layers, the spacers defining a uniform cell gap between the two substrates and being integrally formed on, of the same material as, and simultaneously with, the associated alignment layer.

9. The liquid crystal display panel of claim 8, wherein at least one of the first and second substrates comprises a glass or a plastic substrate.

10. A method for manufacturing a liquid crystal display panel comprising a pair of substrates disposed in facing abutment with each other, the method comprising:

forming a first alignment layer and a plurality of spacers of the same material on one of the substrates; and, forming a second alignment layer facing the first alignment layer on the other substrate.

11. The method of claim 10, wherein the first alignment layer and the spacers are formed integrally and simultaneously.

12. The method of claim 10, wherein the first alignment layer and the spacers are formed by coating an alignment solution on the one substrate and patterning the alignment solution with a mold.

13. The method of claim 12, wherein the mold comprises a flat panel having a plurality of elongated slots in a surface contacting the alignment solution.

14. The method of claim 12, wherein the mold comprises a roll having at least one axial slot in a surface contacting the alignment solution, and wherein the roll is rolled over the alignment solution.

15. The method of claim 10, wherein forming a first alignment layer and a plurality of spacers includes:

coating an alignment solution on the one substrate;

patterning the alignment solution with a mold so as to form the alignment layer and the spacers simultaneously; and, heating the alignment layer and the spacers to harden them.

16. The method of claim 15, further comprising rubbing a surface of the alignment layer in a selected direction to form striations therein.

* * * * *